United States Patent [19]

Bäuerle

[11] 4,087,148

[45] May 2, 1978

[54] ELECTRICAL CONNECTOR WITH ZERO INSERTION FORCE

[75] Inventor: Gerhard Bäuerle, Willsbach, Germany

[73] Assignee: Bunker Ramo Corporation, Oak Brook, Ill.

[21] Appl. No.: 650,193

[22] Filed: Jan. 19, 1976

[30] Foreign Application Priority Data

Jan. 22, 1975 Germany .............................. 2502521

[51] Int. Cl.² .............................................. H01R 13/62
[52] U.S. Cl. .......................... 339/75 MP; 339/17 LC; 339/176 MP
[58] Field of Search .............. 339/17 L, 17 LC, 17 F, 339/75 MP, 176 MP, 176 MF, 59 M

[56] References Cited

U.S. PATENT DOCUMENTS

| | | | |
|---|---|---|---|
| 2,931,006 | 3/1960 | Klumpp | 339/59 M X |
| 2,946,033 | 7/1960 | Wirth | 339/176 MP X |
| 3,020,510 | 2/1962 | Kuch | 339/17 LC |
| 3,639,888 | 2/1972 | Pittman et al. | 339/75 MP |

*Primary Examiner*—Roy Lake
*Assistant Examiner*—E. F. Desmond

*Attorney, Agent, or Firm*—Frederick M. Arbuckle; William Lohff

[57] ABSTRACT

An electrical connector with zero insertion force for mechanically supporting and contacting the conductive fingers of printed circuit boards, liquid crystal plates, and like contact carriers. The connector is comprised of an elongated connector body, an elongated clamping member, and a clamping means to clamp the body and member toward one another with the contact carrier sandwiched therebetween. In a preferred embodiment, the connector body contains a plurality of electrical spring contacts, a portion of each contact extending slightly beyond one lateral sidewall of the body and positioned to contact one of the fingers of the contact carrier when the latter lies adjacent the sidewall. The clamping means serves to draw the body and member toward one another, thereby effecting movement of the contact carrier against the biasing force of the spring contacts and into a surface-to-surface engagement with the sidewall of the body. In the assembled condition, the contact carrier is clamped between the connector body and clamping member with the fingers in firm electrical contact with the spring contacts.

24 Claims, 10 Drawing Figures

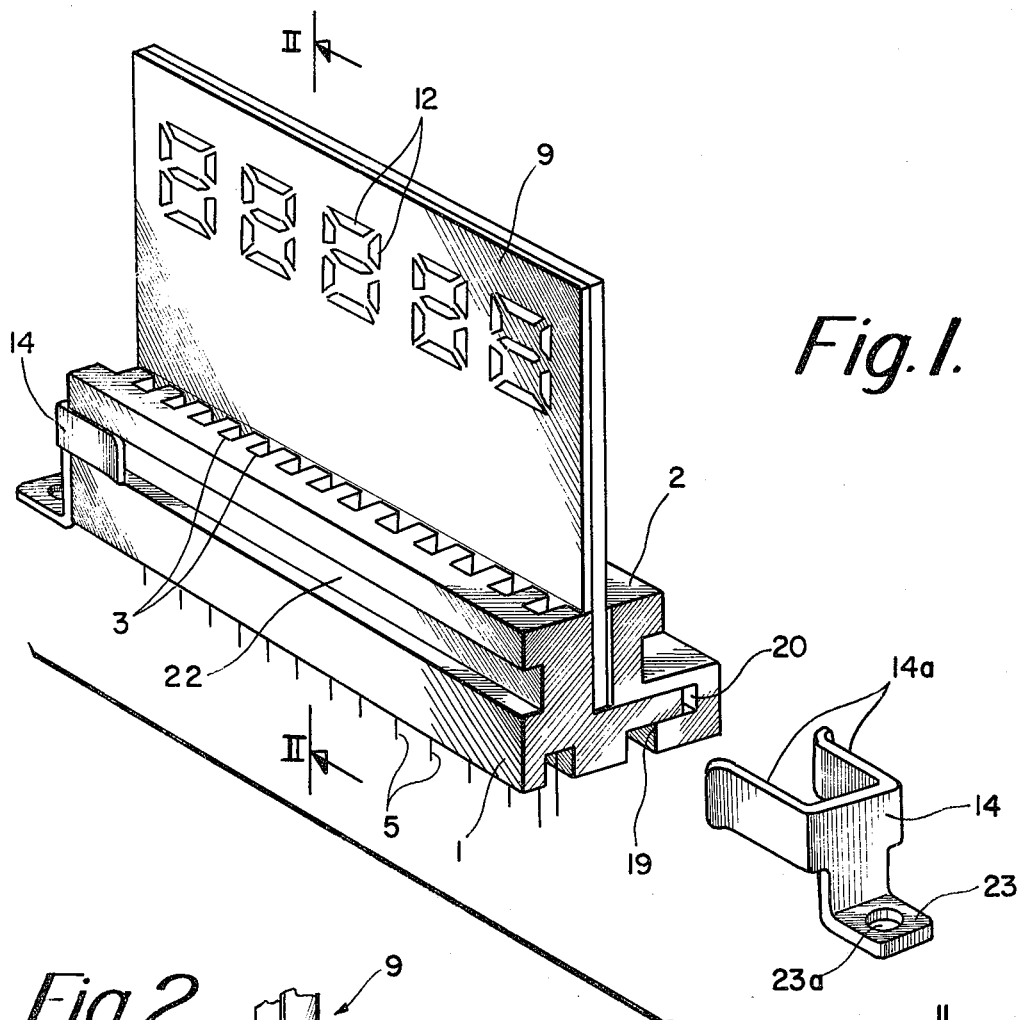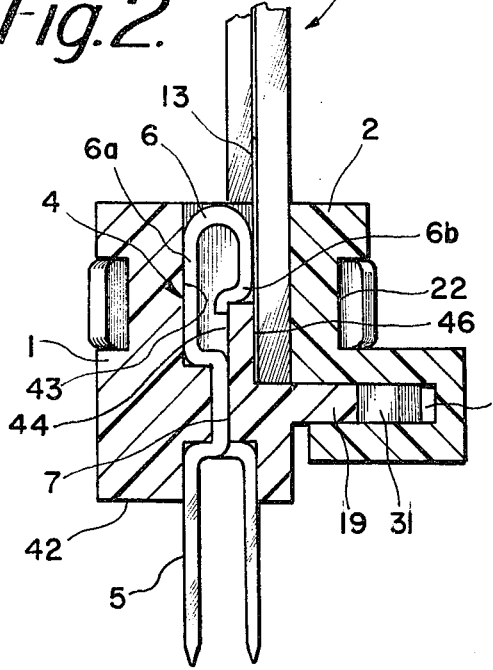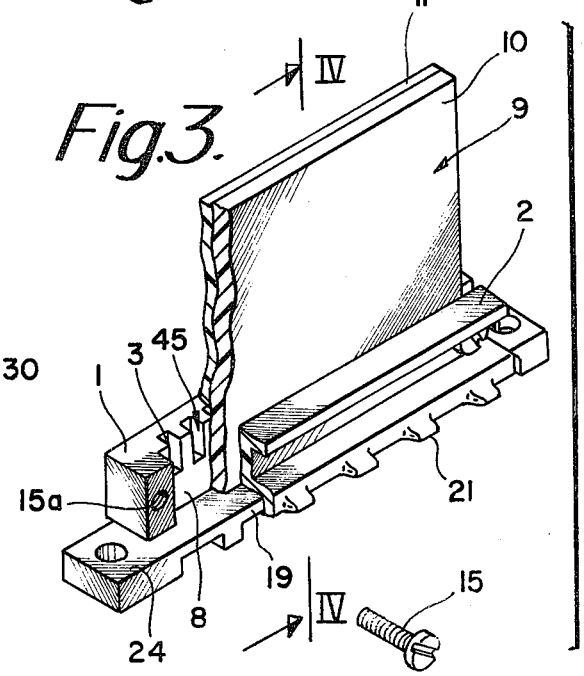

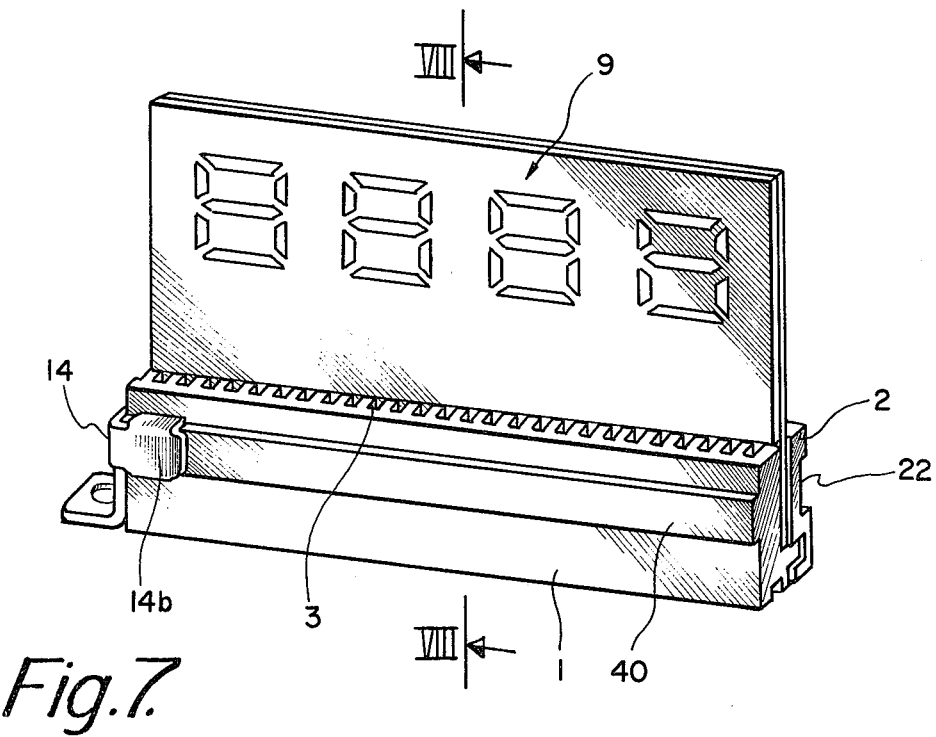
Fig. 7.
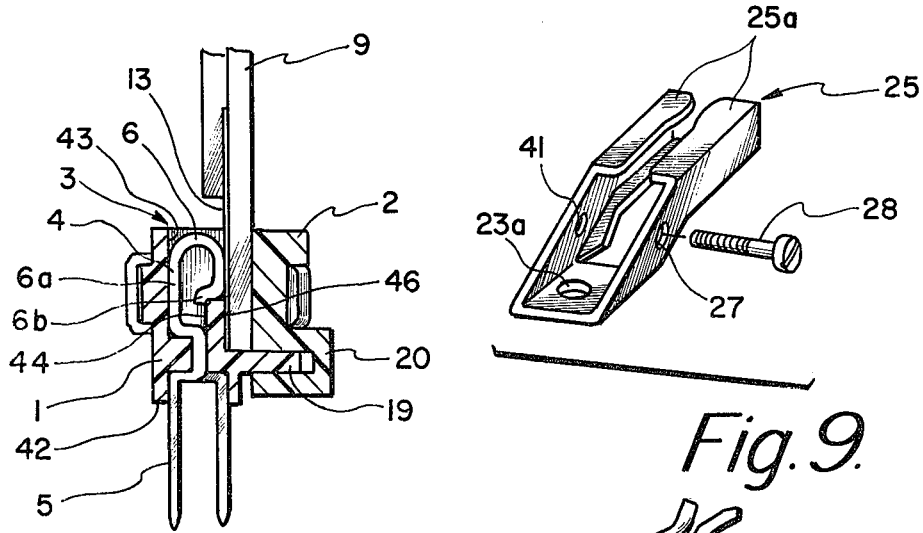
Fig. 8.
Fig. 9.
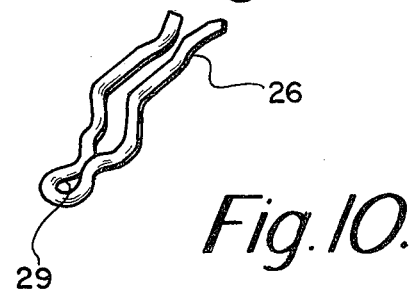
Fig. 10.

ELECTRICAL CONNECTOR WITH ZERO INSERTION FORCE

BACKGROUND OF THE INVENTION

1. Field of the Invention

This invention relates to an electrical connector assembly which exhibits zero insertion force for a printed circuit board, liquid crystal plate, or like contact carriers.

2. Description of the Prior Art

The conventional manner for making electrical connection to a plate-like contact carrier, for example a printed circuit board or liquid crystal plate, is by way of a connector body having an elongated slot therein, and a plurality of spring contacts adapted to apply pressure against the contact carrier when the latter is inserted in the slot to both attain the necessary electrical contact quality and to mechanically support the circuit board. Such connectors are either rack mounted in an electronic instrument with the circuit board insertable therein and removable therefrom, or the connector may be a portion of the printed circuit board itself being soldered thereto and insertable over a contact carrier mounted in the electronic equipment.

Normally, a contact carrier which is to be connected is inserted into the connector slot between the spring contacts until it hits a stop, and inserting the boards in this manner results in a sometimes desirable sliding contact between the conductive fingers on the board and the spring contacts of the connector. However, there are certain contact carriers which are extremely thin or which have conductive fingers that are not sufficiently scratch proof, so that a sliding of the contact carrier into the connector causes damage to the carrier itself or its conductive fingers. For example, the conductive fingers of a liquid crystal glass plate usually have only a thickness of about 0.01mm. Such fingers would be destroyed during the sliding motion into a conventional connector due to the necessarily high mechanical biasing force of the contact springs.

A connector is known which is so constructed that a contact carrier can be positioned with its conductive fingers adjacent the spring contacts, and then, in order to effect sufficient contact pressure, a separate member is inserted into the connector body to press the contact carrier against the contacts. A frame surrounding the contact carrier insures that the carrier cannot be laterally removed from the connector. A disadvantage resulting from this construction, however, is that the contact carrier is mechanically supported only by the spring force of the contacts within the area where the carrier is inserted into the connector. Thus, in assembling, handling, and shipping of the equipment, it would be easily possible to move the contact carrier within the connector back and forth within certain limits, thereby damaging the carrier and/or conductive fingers due to the rubbing of the spring contacts against the delicate conductive fingers and possibly contact carrier.

SUMMARY OF THE INVENTION

The present invention solves the problem of damage to contact carriers and their conductive fingers by providing a connector assembly which provides secure mechanical support for the contact carrier and which simultaneously insures excellent electrical contact between the connector contact elements and the conductive fingers of the carrier.

In accordance with the invention, the connector assembly comprises an elongated connector body, an elongated clamping member, and a clamping means for effecting movement of the clamping member toward the connector body to sandwich the contact carrier therebetween and effect a surface-to-surface engagement between the contact carrier and one lateral sidewall of the connector body, while simultaneously making excellent electrical contact between the spring contacts of the connector body and the conductive fingers on the contact carrier.

The spring contacts of the connector body extend lightly beyond one lateral sidewall of the body and are positioned to contact the fingers of the contact carrier when the carrier lies adjacent that sidewall. Thus, when the clamping member is moved toward the connector by the clamping action of the clamping means, the first point of contact between the body and the carrier exists between the extended portions of the spring contacts and the conductive fingers on the carrier. Then, upon further movement of the carrier against the biasing force of the spring contacts, the lateral sidewall serves as a stop surface against which the carrier is pressed. In this manner, the carrier is mechanically and reliably clamped against the stop surface eliminating the possibility of damage to the conductive fingers or the carrier itself due to any unavoidable shaking environment or inadvertent bumping of the carrier.

Thus, the connector assembly in accordance with the invention has the advantage that the contact carrier can be connected with the contacts of the connector body without mechanical stress. Particularly, it should be noted that no frictional forces are exerted upon the contacts of the connector body. Additionally, the mechanical support of the contact carrier is provided by the clamping action between the stop surface of the connector body and the clamping member. The clamping force realized by such a connector assembly amounts to the sum total of the contact forces against the spring contacts and that between the clamping member, the carrier, and the stop surface of the connector body. Accordingly, when assembled, the contact carrier cannot normally be removed without first removing the clamping member. It should also be noted that the clamping force against the stop surface is independent of the force exerted by the spring contacts, so that a sufficient mechanical clamping force can be achieved even for applications requiring a very low electrical contact force. Additionally, the same connector assembly can be utilized for contact carriers of different thicknesses.

BRIEF DESCRIPTION OF THE DRAWINGS

The invention will now be described in detail with reference to the accompanying drawings representing preferred embodiments of the electrical connector assembly according to the present invention. In the drawings:

FIG. 1 is a perspective drawing showing a first embodiment of the invention having a liquid crystal plate inserted therein;

FIG. 2 is a cross-sectional view taken along line II—II of FIG. 1 on an enlarged scale;

FIG. 3 is a perspective view of a second embodiment in accordance with the invention having a liquid crystal plate inserted therein;

FIG. 7 is a perspective drawing of a fourth embodiment of the invention having a liquid crystal plate inserted therein;

FIG. 8 is a cross-sectional view taken along line VIII—VIII of FIG. 7 on an enlarged scale;

FIG. 9 shows a clamp element for clamping together a clamping member and a connector body; and FIG. 10 shows a second embodiment of the clamp element.

DESCRIPTION OF THE PREFERRED EMBODIMENTS

Figure 4:
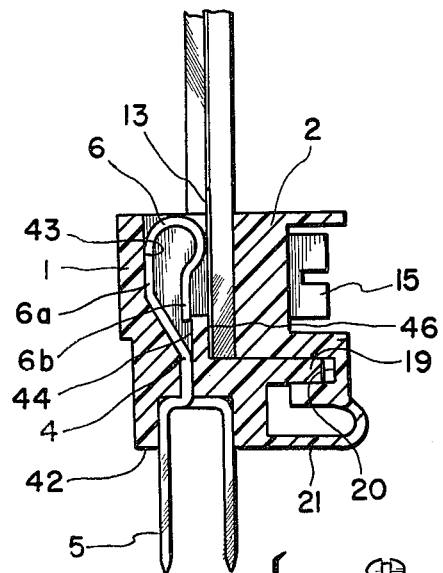
FIG. 4 is a cross-sectional view taken along line IV—IV of FIG. 3 on an enlarged scale.

The connector assemblies illustrated in FIGS. 1-8 comprise a connector body 1 and a clamping member 2. In the connector body 1, there are arranged aligned individual contact chambers 3. In the contact chambers 3, there are disposed spring contacts 4 formed of a bent metal wire or strip and consisting of a connecting terminal portion 5 and a spring portion 6. The terminal portions 5 of the contacts 4 extend out of contact chambers 3 through lower opening 7 in the bottom wall 42 of the connector body 1. The terminal portions 5 of each pair of adjacent contacts 4 are bent in opposite directions, as best seen in FIGS. 2, 4, and 8, in order to make the spacing between terminal portions as large as possible. The terminal portions 5 are generally soldered to a printed circuit board (not illustrated).

The spring portions 6 of the contacts 4 are essentially of U-shape. The leg 6a of the U-shaped spring portion 6 connected to the terminal portion 5 bears against the left wall 43 (FIGS. 2, 4, 8) of the contact chamber 3, while the free end 6b of the other U leg bears against the right wall 44 of the contact chamber 3. On the right hand side of the connector body 1, as illustrated in the drawings of FIGS. 2, 4, and 8, the contact chambers are shown to be open defining a slot 45 (FIG. 3) adjacent the top of the connector body 1 so that a part of the spring portion 6 of the contacts 4 extends beyond the outer edge of sidewall 46 of the connector body when there is no contact carrier in clamped position on the connector body 1.

The clamping member 2 may be clamped upon the connector body 1 such that a contact carrier 9, which can be inserted with a zero insertion force between the clamping member 2 and the connector body 1, can be pressed against the stop surface 8 (FIG. 3) of sidewall 46. The means by which the connector body and clamping member are clamped together are different for the different embodiments which will be subsequently described.

In the embodiments of the invention illustrated in the drawing, a liquid crystal plate 9, which serves as an example of a delicate contact carrier, is inserted into the connector assembly. The plate 9 comprises a carrier plate 10, and a cover plate 11 fixed upon the carrier plate 10. Between the carrier plate 10 and the cover plate 11, there are embedded individual segments 12 of the liquid crystal material. The individual segments 12 are connected with conductive strips which are disposed on one side of carrier plate 10 and extend toward an edge of carrier plate 10 to define equally spaced conductive fingers 13 along one edge of carrier plate 10. The fingers 13 are spaced the same distance as are the spring contacts 4 and chambers 3. At the edge of the contact carrier 9, where the conductive fingers 13 extend outwardly, the cover plate 11 is shorter than the carrier plate 10 so that the conductive fingers are exposed.

The connector is assembled as follows. The liquid crystal plate 9 is situated with respect to the conductor body 1 so that the edge of the carrier 9 having the conductive fingers 13 thereon is facing stop surface 8 and aligned with the conductive fingers 13 making initial contact with spring contacts 4. The clamping member 2 is then placed against the edge of the carrier 9 carrying fingers 13, but adjacent the side of the carrier opposite the side carrying conductive fingers 13. A clamping means is then employed to urge the clamping member 2 toward the connector body 1 with the contact carrier 9 sandwiched therebetween. When the liquid crystal plate 9 bears against the stop surface 8 under such clamped condition, the contacts 4 exert a sufficiently high contact pressure upon conductive fingers 13, due to their elastic bias, to ensure reliable electrical contact.

The clamping means can take on a variety of forms, and several different embodiments of the clamping means are shown in the drawing. In the embodiments illustrated in FIGS. 1 and 7, spring clamps 14 are shown having spaced arms 14a for embracing respective outer walls of the connector body 1 and clamping member 2 adjacent their ends. The clamping force is provided by the two spaced arms 14a by the natural spring force exerted by the spaced arms 14a on the outer walls of the connector body 1 and clamping member 2.

In the embodiment illustrated in FIG. 3, the clamping member 2 and connector body 1 are brought together under the action of screw 15 which can be screwed into threads 15a provided in the connector body 1 to thereby press the clamping member 2 against the back side of carrier plate 9 until the front edge of the carrier plate 9 stops against stop surface 8.

Figure 5:
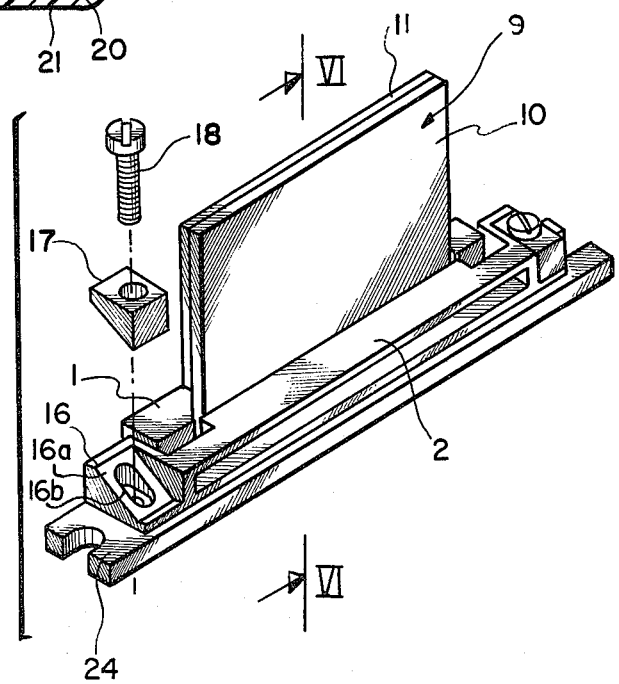
FIG. 5 is a perspective drawing showing a third embodiment of the invention having a liquid crystal plate inserted therein.

FIG. 5 shows another embodiment of the invention, whereby the clamping means comprises a cammed pressure element 16 at each end of clamping member 2, each pressure element 16 having an inclined surface 16a which receives cam element 17 in a manner such that the cam surfaces of each element 16 and 17 can slide relative to one another. A screw 18, passing through cam element 17 and an elongated aperture 16b of pressure element 16, is threaded into, and thereby fixed relative to, connector body 1. When screw 18 is tightened, cam element 17, being fixed in position relative to connector body 1, causes a camming action to take place forcing pressure element 16, and thereby clamping member 2, to be moved in a direction toward stop surface 8 of connector body 1.

To insure proper positioning of the clamping member 2 as well as smooth and accurate lateral pressure against contact carrier 9, connector body 1 is provided with a guide shoulder 19 extending longitudinally of body 1 and projecting outwardly from the lower portion of stop surface 8 (FIGS. 1-4, 7, and 8). An elongated guide groove 20 is provided along the inner wall of clamping member 2 so that the groove 20 receives guide shoulder 19 to guide the clamping member 2 in its lateral movement toward the body 1 under the influence of the clamping means. In the embodiments shown, the shoulder 19 is normal to the stop surface 8, and guide groove 20 is generally U-shaped for receiving the shoulder 19 in a close sliding fit.

In order to assure correct lateral positioning of the clamping member 2 with respect to connector body 1, either the shoulder 19 or the groove 20 may have a lateral guide projection 31 (shown in FIG. 2 on shoulder 19) extending therefrom, and the other may have a lateral recess 30 (shown in FIG. 2 in groove 20) for receiving the projection 31, thereby forming an indexing means for longitudinal alignment of the clamping member 2 with respect to connector body 1.

The embodiment of FIG. 3 shows a connector body 1 and clamping member 2 molded from a single piece of material, whereby the two main portions 1 and 2 are connected by elastic hinges 21 arranged along an axis parallel to the longitudinal axis of the body 1 and strip 2. This arrangement avoids the necessity of providing lateral guide means between the connector body 1 and clamping member 2.

As seen in FIG. 1, the clamping member 2 and/or connector body 1 may have a longitudinal groove 22 along its outer wall within which an arm 14a of spring clamp 14 can be inserted. The spring clamp 14 may also be provided with a lateral flange 23 having a mounting bore 23a so that the connector assembly held together by spring clamps 14 can be simply secured by means of flange 23 to a base plate, for example such as a printed circuit board. A similar fastening of the connector assembly according to the embodiments of FIGS. 3 and 5 are possible by means of an edge flange 24 provided at the extreme ends of connector body 1.

As best seen in FIG. 1, the connector body 1 and clamping member 2 may be formed in long lengths and cut to the desired length. This feature has the advantage that the connector body 1 and clamping member 2 may be cut to fit any of a variety of different widths of contact carriers 9.

As shown in FIG. 7, connector body 1 may be provided with a rib 40 as opposed to a groove 22. The arms 14b of spring clamp 14 are then of different configuration as shown in FIG. 7 in order to embrace the rib 40.

FIGS. 9 and 10 illustrate alternative embodiments of the spring clamps 14 shown in FIGS. 1 and 7. The spring clamp 25 shown in FIG. 9 is provided with a hole 27 through which a screw 28 may extend to threads 41 in order to compress the two legs 25a of the spring clamp 25 together. This embodiment has the advantage that contact carriers of different thicknesses can be accommodated and yet be capable of being adjusted as to clamping force. For example, with such a spring clamp 25, contact carriers 9 of a thickness of between 1.5 and 3 mm can be utilized.

The spring clamp 26 of FIG. 10 consists of a single bent steel wire which can be manufactured in a very simple manner. The eye 29 formed by a loop in the wire serves the same purpose as apertures 23a in the spring clamps 14 and 25 of FIGS. 1 and 9, respectively.

Figure 6:
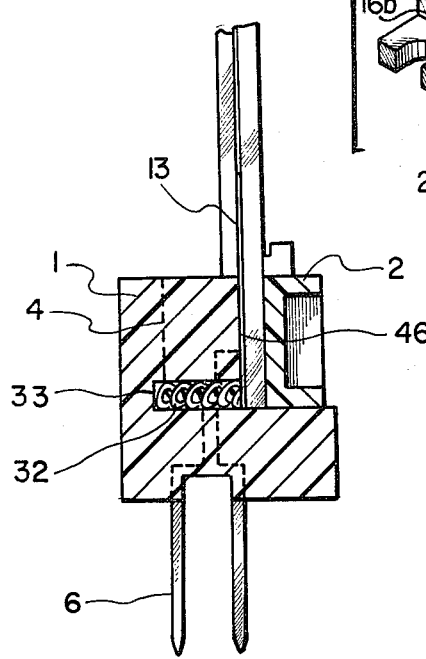
FIG. 6 is a cross-sectional view taken along line VI—VI of FIG. 5 on an enlarged scale.

FIG. 6 shows an improvement of the invention according to the subject application, in which the stop surface 8 may be provided with a depending bore 33 within which a coiled spring element 32 is positioned. The spring element 32 is sized to extend beyond stop surface 8 in an unassembled condition and is compressible by either the carrier plate 9 or clamping member 2 in an assembled condition. In this manner, upon release of the clamping means, spring element 32 acts to separate connector body 1 from clamping member 2 in order that contact carrier 9 can be immediately lifted away from the area of contacts 4.

All of the illustrated embodiments of the invention have the advantage that they can be connected with the contact carrier 9 without the contacts 4 rubbing on the conductive fingers 13. Furthermore, the invention makes it possible to utilize very thin contact carriers 9 which cannot be inserted into conventional connector types. A further advantage of the described connector assemblies lies in the fact that the contact carrier 9 can be secured between the connector body 1 and clamping member 2 without any play. Furthermore, contact carriers of different thicknesses can be connected with the same connector assembly without changing the contact pressure between contacts 4 and the conductive fingers 13. Finally, an advantage of the embodiment of FIG. 5 can be seen in that it can be positioned into a deeply recessed area of an instrument and yet be able to function properly, since a screw driver can be inserted parallel to the contact carrier 9 to turn screw 18 in order to clamp and release the carrier.

The connector body and clamping member according to the invention are preferably made by diecasting and may consist of conventional insulating materials such as synthetic materials.

From the foregoing, it can be readily realized that this invention can assume various embodiments. Thus, it is to be understood that the invention is not limited to the specific embodiments described herein, but is limited only by the appended claims.

What is claimed is:

1. An electrical connector assembly for receiving a contact carrier in the form of a flat plate having a plurality of spaced conductive contact fingers along a front edge thereof, said assembly comprising:

an elongated connector body including a lateral sidewall and containing a plurality of electrical spring contacts, a portion of each of said spring contacts extending slightly beyond said lateral sidewall of said body and positioned to contact one of said fingers of said contact carrier when said carrier lies adjacent said lateral sidewall of said body;

an elongated clamping member clampable against the rear edge of said carrier opposite said front edge; and clamping means on said connector body and said clamping member for effecting movement of said carrier against the biasing force of said spring contacts into a surface-to-surface engagement with said lateral sidewall of said body, thereby clamping said carrier between said connector body and said clamping member with said fingers in electrical contact with said spring contacts, said clamping means comprising a spring clamp having spaced arms for embracing respective outer walls of said body and clamping member adjacent their ends, said body and said clamping member each having a longitudinal groove along its outer wall for receiving a respective arm of said spring clamp, and said clamping means including a screw for drawing said arms together against said outer walls.

2. The connector assembly as claimed in claim 1, wherein:

said lateral sidewall of said body defines a stop surface for said carrier; and said movement caused by said clamping means is in a direction towards and perpendicular to said stop surface.

3. The connector assembly as claimed in claim 2, wherein said connector body has a plurality of contact chambers therein, each said chamber containing one of said spring contacts, each of said chambers opening to form a slot in said lateral sidewall of said body, said spring contact portions extending through said slots, the surface of said lateral sidewall around said slots serving as said stop surface.

4. The connector assembly as claimed in claim 1, including:
an elongated guide shoulder projecting outwardly of said body along said lateral sidewall; and
an elongated guide groove along said clamping member whereby said groove receives said shoulder to guide said clamping member in its lateral movement toward said body under the influence of said clamping means.

5. The connector assembly as claimed in claim 4, wherein:
said shoulder is normal to said lateral sidewall; and
said guide groove is generally U-shaped for effectively receiving said shoulder in a close sliding fit.

6. The connector assembly as claimed in claim 5, wherein one of said shoulder and groove has a lateral guide projecting therefrom and the other has a lateral recess for receiving said guide projection, thereby forming an indexing means for longitudinal alignment of said clamping member with respect to said body.

7. An electrical connector assembly for receiving a contact carrier in the form of a flat plate having a plurality of spaced conductive contact fingers along a front edge thereof, said assembly comprising:
an elongated connector body including a lateral sidewall and containing a plurality of electrical spring contacts, a portion of each of said spring contacts extending slightly beyond said lateral sidewall of said body and positioned to contact one of said fingers of said contact carrier when said carrier lies adjacent said lateral sidewall of said body;
an elongated clamping member clampable against the rear edge of said carrier opposite said front edge; and
clamping means on said connector body and said clamping member for effecting movement of said carrier against the biasing force of said spring contacts into a surface-to-surface engagement with said lateral sidewall of said body, thereby clamping said carrier between said connector body and said clamping member with said fingers in electrical contact with said spring contacts,
said clamping means comprising:
a cam surface adjacent one end of said clamping member,
a cam element held fixed against lateral movement with respect to said body, and
a screw for drawing said cam element and said surface together to effect movement of said member toward said body thereby effecting said movement of said carrier toward said lateral sidewall.

8. The connector assembly as claimed in claim 7, wherein:
said lateral sidewall of said body defines a stop surface for said carrier; and
said movement caused by said clamping means is in a direction towards and perpendicular to said stop surface.

9. The connector assembly as claimed in claim 8, wherein said connector body has a plurality of contact chambers therein, each said chamber containing one of said spring contacts, each of said chambers opening to form a slot in said lateral sidewall of said body, said spring contact portions extending through said slots, the surface of said lateral sidewall around said slots serving as said stop surface.

10. The connector assembly as claimed in claim 7, including:
an elongated guide shoulder projecting outwardly of said body along said lateral sidewall; and
an elongated guide groove along said clamping member whereby said groove receives said shoulder to guide said clamping member in its lateral movement toward said body under the influence of said clamping means.

11. The connector assembly as claimed in claim 10, wherein:
said shoulder is normal to said lateral sidewall; and
said guide groove is generally U-shaped for effectively receiving said shoulder in a close sliding fit.

12. The connector assembly as claimed in claim 11, wherein one of said shoulder and groove has a lateral guide projecting therefrom and the other has a lateral recess for receiving said guide projection, thereby forming an indexing means for longitudinal alignment of said clamping member with respect to said body.

13. An electrical connector assembly for receiving a contact carrier in the form of a flat plate having a plurality of spaced conductive contact fingers along a front edge thereof, said assembly comprising:
an elongated connector body comprising a lateral sidewall having a bore therein, and a plurality of electrical spring contacts, a portion of each of said spring contacts extending slightly beyond said lateral sidewall of said body and positioned to contact one of said fingers of said contact carrier when said carrier lies adjacent said lateral sidewall of said body;
an elongated clamping member clampable against the rear edge of said carrier opposite said front edge;
clamping means on said connector body and said clamping member for effecting movement of said carrier against the biasing force of said spring contacts into a surface-to-surface engagement with said lateral sidewall of said body, thereby clamping said carrier between said connector body and said clamping member with said fingers in electrical contact with said spring contacts; and
a compression spring disposed in said body and acting to urge said clamping member away from said body when said connector assembly is assembled.

14. The connector assembly as claimed in claim 13, wherein:
said lateral sidewall of said body defines a stop surface for said carrier; and
said movement caused by said clamping means is in a direction towards and perpendicular to said stop surface.

15. The connector assembly as claimed in claim 14, wherein said connector body has a plurality of contact chambers therein, each said chamber containing one of said spring contacts, each of said chambers opening to form a slot in said lateral sidewall of said body, said spring contact portions extending through said slots, the surface of said lateral sidewall around said slots serving as said stop surface.

16. The connector assembly as claimed in claim 13, including:

an elongated guide shoulder projecting outwardly of said body along said lateral sidewall; and an elongated guide groove along said clamping member whereby said groove receives said shoulder to guide said clamping member in its lateral movement toward said body under the influence of said clamping means.

17. The connector assembly as claimed in claim 16, wherein:

said shoulder is normal to said lateral sidewall; and said guide groove is generally U-shaped for effectively receiving said shoulder in a close sliding fit.

18. The connector assembly as claimed in claim 17, wherein one of said shoulder and groove has a lateral guide projecting therefrom and the other has a lateral recess for receiving said guide projection, thereby forming an indexing means for longitudinal alignment of said clamping member with respect to said body.

19. An electrical connector assembly for receiving a contact carrier in the form of a flat plate having a plurality of spaced conductive contact fingers along a front edge thereof, said assembly comprising:

an elongated connector body including a lateral sidewall and containing a plurality of electrical spring contacts, a portion of each of said spring contacts extending slightly beyond said lateral sidewall of said body and positioned to contact one of said fingers of said contact carrier when said carrier lies adjacent said lateral sidewall of said body;

an elongated clamping member clampable against the rear edge of said carrier opposite said front edge;

clamping means on said connector body and said clamping member for effecting movement of said carrier against the biasing force of said spring contacts into a surface-to-surface engagement with said lateral sidewall of said body, thereby clamping said carrier between said connector body and said clamping member with said fingers in electrical contact with said spring contacts;

an elongated guide shoulder projecting outwardly of said body along said lateral sidewall;

an elongated guide groove along said clamping member whereby said groove receives said shoulder to guide said clamping member in its lateral movement toward said body under the influence of said clamping means;

hinge means connecting and unitary with said body and said clamping member hinging said body to said clamping member along an axis parallel to the longitudinal axis of said body and member.

20. The connector assembly as claimed in claim 19, wherein:

said lateral sidewall of said body defines a stop surface for said carrier; and said movement caused by said clamping means is in a direction towards and perpendicular to said stop surface.

21. The connector assembly as claimed in claim 20, wherein said connector body has a plurality of contact chambers therein, each said chamber containing one of said spring contacts, each of said chambers opening to form a slot in said lateral sidewall of said body, said spring contact portions extending through said slots, the surface of said lateral sidewall around said slots serving as said stop surface.

22. The connector assembly as claimed in claim 19, wherein:

said shoulder is normal to said lateral sidewall; and said guide groove is generally U-shaped for effectively receiving said shoulder in a close sliding fit.

23. The connector assembly as claimed in claim 22, wherein one of said shoulder and groove has a lateral guide projecting therefrom and the other has a lateral recess for receiving said guide projection, thereby forming an indexing means for longitudinal alignment of said clamping member with respect to said body.

24. The connector assembly as claimed in claim 19, wherein said clamping means comprises a screw clamping said body and member together.

* * * * *